Sept. 29, 1936.  S. I. ZACK  2,056,062
APPARATUS FOR AND METHOD OF TREATING SEWAGE
Filed Feb. 17, 1933   2 Sheets-Sheet 1
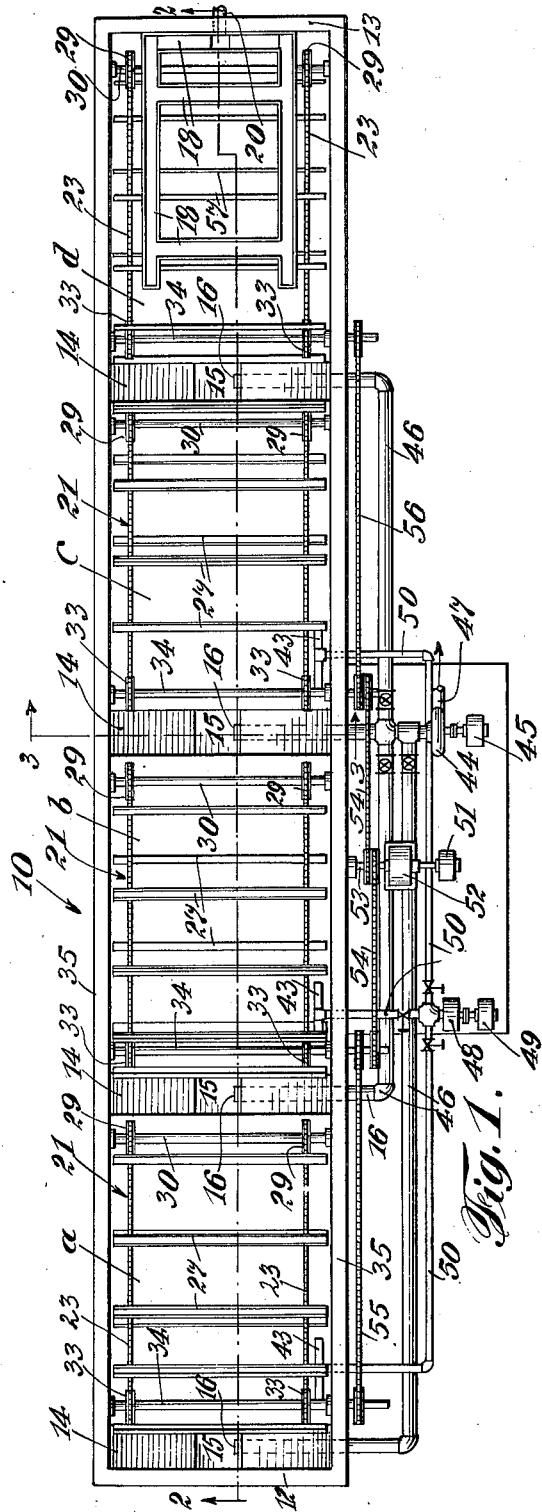
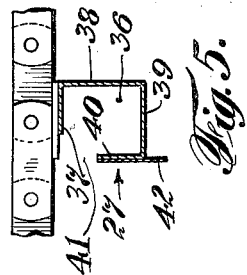
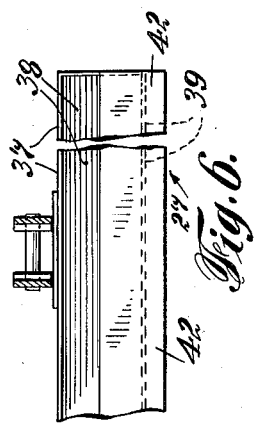
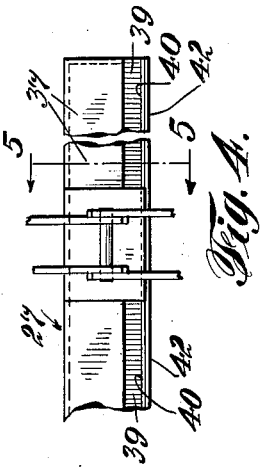
INVENTOR-
Samuel I. Zack
BY C. P. Goepel
his ATTORNEY- Sept. 29, 1936.   S. I. ZACK   2,056,062
APPARATUS FOR AND METHOD OF TREATING SEWAGE
Filed Feb. 17, 1933   2 Sheets-Sheet 2
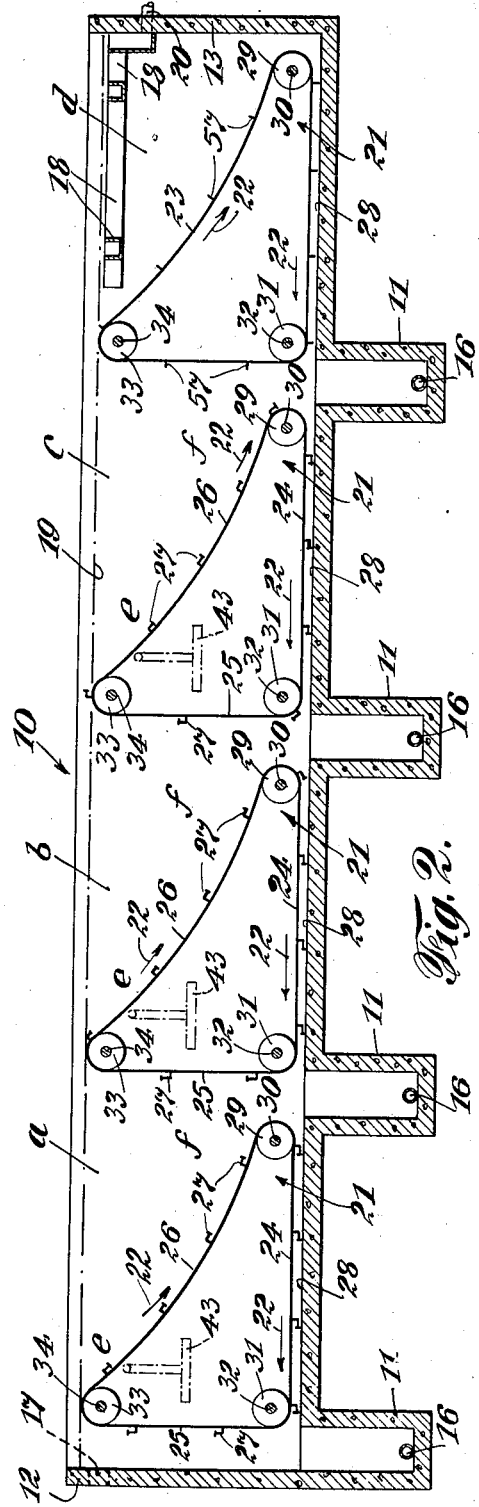
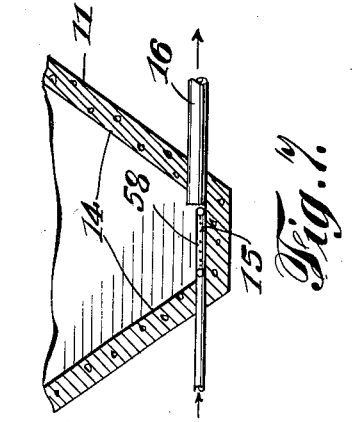
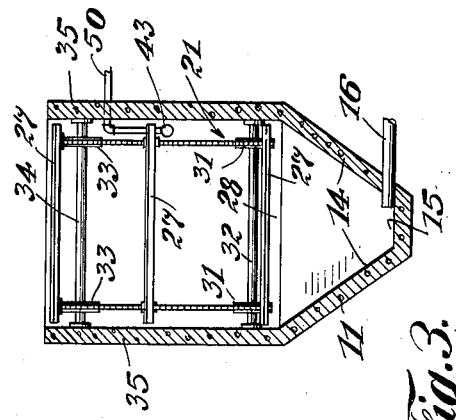
INVENTOR-
Samuel I. Zack
BY C. P. Goebel
his ATTORNEY- Patented Sept. 29, 1936

2,056,062

UNITED STATES PATENT OFFICE 2,056,062

APPARATUS FOR AND METHOD OF TREATING SEWAGE

Samuel I. Zack, Detroit, Mich., assignor to Filtration Equipment Corporation, New York, N. Y., a corporation of Delaware Application February 17, 1933, Serial No. 657,177

15 Claims. (Cl. 210—8)

This invention relates to apparatus for and a method or process of treating sewage or other liquid, the invention being more particularly related to an improved apparatus and process for the complete treatment, purification and final clarification of sewage and waste waters to produce an effluent low in organic and inorganic impurities. The invention is particularly concerned with a successive zone aeration-flocculation treatment for promoting, accelerating and intensifying the processes of aeration, bacterial action and flocculation.

Among the objects of the invention are: to satisfy the oxygen demand of the sewage and sludge at a constant rate; to keep the sewage and sludge constantly moving and in contact with dissolved oxygen whereby to be activated; and to maintain the activated sludge in a good or built-up operating condition for creating and promoting the growth of bacterial life and for intensifying its properties of absorbing and flocculating the suspended and colloidal matter in the sewage.

Another object of the invention is to provide an improved treating system having improved mechanical means for moving the activated sludge in contact with the sewage and in a manner to allow the sludge to become thoroughly mixed with the sewage while at the same time obtaining the benefit of a sweeping action or blanketing effect of sludge in a downward direction through the sewage and deeper strata thereof for promoting uniform absorption and flocculation, and bringing the activated sludge particles in contact with colloidal particles. The mechanical means for effecting the moving and mixing of the sludge is constructed and arranged to gather solids and semi-solids from the bottom of the treating chamber and to discharge them adjacent the top thereof for making more effective the downward sweeping action and aiding flocculation. To accomplish these purposes, the mechanical means may consist of paddle-like buckets for keeping the sludge in motion and for bringing the same in contact with incoming raw sewage and liquid containing dissolved oxygen.

Another object of the invention is to provide an apparatus and system having multiple-zones for carrying out aeration, mixing, downward sweeping action and flocculation in each of the several successive zones. In each of the zones, a combination paddle-like bucket and scraper device is used to move settled sludge into a sump or hopper for removal from the system, with the paddle-like buckets serving as the instrumentalities for the return of a portion of the sludge to the beginning of the zone for discharge at or near the surface of the sewage. According to an important feature of the arrangement, atmospheric air is entrapped by the buckets adjacent the surface of the sewage and then subsequently released below the surface and in the deeper strata of the sewage. Auxiliary air for oxidation and mixing purposes is supplied by diffusion or mechanical means. As the paddle-like buckets keep the sludge in motion and in contact with incoming raw sewage, the air is used chiefly to supply oxygen. In this improved multi-zone flocculation system, it is the aim to aerate the sewage and sludge just enough to satisfy the demand for oxygen. The removal of solids from each zone plays an important part since thereby the load on the system is progressively reduced requiring less total air.

The improved multiple-zone aeration-flocculation process or system of treatment may be carried out in one continuous tank suitably baffled to aerate, separate out the sludge and collect the effluent, and this tank following the last zone or stage of flocculation, may include a chamber for final clarification of the effluent before its discharge from the tank.

With the foregoing and other objects in view, the invention consists in the improved apparatus, its form, construction and arrangement of parts for performing the functions and accomplishing the results herein contemplated, and in the improved process and system of treating sewage, all as will be hereinafter more fully described.

In the drawings, in which I have disclosed a simple and practical example of the several novel features of my invention, and in which similar reference characters designate corresponding parts throughout the several views:—

Figure 1 is a top plan view of an apparatus made in accordance with my invention;

Fig. 2 is a central longitudinal sectional view taken on the line 2—2 of Fig. 1;

Fig. 3 is a vertical cross section taken on the line 3—3 of Fig. 1;

Fig. 4 is a fragmentary plan view on a larger scale of a bucket and scraper device;

Fig. 5 is a cross sectional view taken on the line 5—5 of Fig. 4;

Fig. 6 is a section and plan taken on the line 6—6 of Fig. 4; and

Fig. 7 is a sectional detail, showing a sludge sump furnished with a perforated air pipe.

By referring to the drawings, it will be seen that the invention is disclosed as embodied in an elongated tank 10 which may be built or produced from concrete or any other suitable or approved material. In the present disclosure, the bottom of the tank structure is represented as provided with spaced sumps or hoppers 11, the spacing of which, one from the other, is substantially equal to the length dimension of the successive zones or stages of sewage treatment, which zones or stages for convenience of ready reference are indicated successively from the influent end 12 of the tank to the effluent end 13 thereof, by the reference characters a, b, c and d. The opposite sides or walls of each sump or hopper may slope downwardly and inwardly toward one another as shown at 14 (Fig. 3) in order to accumulate sludge upon the restricted bottom 15 for withdrawal through a suction pipe 16.

At the influent end of the tank the raw sewage to be treated enters the zone a through an inlet opening 17; and at the opposite or effluent end 13, there is provided an arrangement of effluent troughs 18, the tops of which are just below the liquid surface 19, so that after treatment in the several successive zones, the clear, purified liquor will spill into the troughs over the tops thereof for discharge through an effluent outlet 20 into which the troughs feed. Through a continuous influx of raw sewage through the inlet 17, a liquid surface is maintained at a level as 19, and there is a constant movement of the liquor through the successive zones.

Within each of the several zones there is provided an endless conveyor indicated in general by the reference character 21 and which travels or circulates in the direction indicated by the arrow 22. Each of the several conveyors 21 comprises suitable oppositely disposed endless chains 23, 23 which are engaged with sprocket wheels so as to provide a lower substantially horizontal run 24, a vertical run 25 and a downwardly inclined run 26. The endless chains 23, 23 are connected at intervals by cross members 27. The conveyor chains, near the end of the treating zone and adjacent the bottom wall 28 thereof, are engaged with sprocket wheels 29 carried by a shaft 30; at the beginning of the zone and adjacent the said bottom wall they are engaged with sprocket wheels 31 on a shaft 32; and at the beginning of the zone adjacent the surface 19 they are engaged with sprocket wheels 33 carried by a shaft 34 which, in the present embodiment, constitutes the driving shaft for imparting movement to the chains and effecting the operation of the conveyor. The said shafts 30, 32 and 34 are suitably mounted at their opposite ends in the opposite side walls 35, 35 of the tank structure. Each of the endless conveyors 21 is substantially triangular in outline, having one run 24 traveling substantially parallel with the bottom wall 28, another run 25 traveling upwardly across the influent stream into the treating zone, while the third run 26 travels diagonally across the zone from the upper beginning thereof to adjacent the lower end thereof. The width of each of the conveyors may be only slightly less than the interior cross dimension of the zone which it occupies, so that during the travel of the conveyor, its cross members 27 will be moved on the triangular circuit through the sewage and liquid for substantially the entire width of the zone.

The cross members 27 carried by the conveyors in each of the zones a, b and c, are made in the form of paddle-like buckets and scrapers. As shown in detail in Figs. 4, 5 and 6, each of these cross members is constructed to provide an elongated pocket 36 which is defined by a top wall 37, a rear wall 38, a bottom wall 39, and a partial front wall 40 which extends upwardly a distance from the bottom wall 39 and so as to leave an upper opening 41 through which material may pass into and out of the pocket 36. Each of these paddle-like buckets is attached to the chains 23, 23 by suitably securing the top wall 37 to a link of each of said chains. The front wall 40 of each bucket has an extension 42 which extends well below the bottom wall 39 so as to serve as a scraper for engaging sludge deposited upon the bottom 28. As the endless conveyor travels on its circuit, each of the combination bucket and scraper devices in passing along the bottom wall 28 scrapes up and accumulates sludge for passage through the opening 41 into the pocket 36, and all excess sludge which is not directed into the pocket 36 is scraped along for deposit in the sump or hopper 11 located adjacent the beginning of the zone.

According to an important feature of my construction and arrangement, the upper sprocket wheels 33 are so located with respect to the liquid surface 19 that when the conveyor passes around these sprocket wheels, the buckets will turn in an arc through the atmosphere above the liquid surface so as to expose to the atmosphere the sludge carried thereby and so as to entrap atmospheric air for diffusion with the sludge into the influent sewage below the liquid surface. The sludge which is gathered in the buckets from the bottom of the zone is of course of the activated variety and this sludge in being passed through atmospheric air is of course aerated. As the buckets turn through the atmosphere, they are inverted sufficiently to permit discharge of the sludge carried thereby, which sludge in falling from the buckets, falls through the atmosphere and into the aeration tract or section e where it is mixed with the tank liquor and incoming fresh sewage by the compressed air issuing from a diffuser 43. As the sludge is dumped from the buckets, the latter entrap air from the atmosphere before becoming submerged, and the air so entrapped is released in the tank liquor below the surface thereof. Diffusion of the dumped sludge and entrapped air through the influent sewage is naturally aided by the moving buckets which move along the downwardly inclined run 26, so that in the upper beginning of the zone, there is created in the influent sewage an aeration tract or section e in which the sewage and downwardly diffusing activated sludge and the air are brought into contact and intermixed to produce an aerated sewage and sludge conglomerate rich in micro-organisms which protect it from putrefaction and which oppose the development of putrefactive micro-organisms, thereby effectively carrying on the work of purifying the incoming raw, untreated sewage.

In the above arrangement, it will be noted that in addition to the air released from the buckets, air is being constantly diffused through the aeration tract by means of the porous diffuser 43. The natural hydraulic flow through the tank of liquid sewage will carry the mixture of sewage, sludge, air and liquor from the tract e into a flocculation tract f adjacent the effluent end of the zone; and in this connection it will be realized that the downward and rearward travel of the run 26 will appreciably aid in moving the mixture to the flocculation track f. During the continuous hydraulic flow maintained through the successive zones a, b, c and d, the solid particles of sewage and sludge which are heavier than the clear liquor will in each individual zone, sweep downward and rearward with a blanketing effect, the while enmeshing and carrying with them the colloidal particles. This blanketing or sweeping effect is of course materially aided in each zone because of the movement therein of the paddle-like buckets along the run 26, with the result that in each zone there is constantly taking place a progressive blanketing effect or sweeping action in a downward and rearward direction through the flocculation tract f for effectively removing the suspended and colloidal matter from the sewage. In the aeration and flocculation tracts there is brought about a constant absorption action and flocculation effect and in which the activated sludge particles are brought into contact with the colloidal particles. These results are aided and intensified by the stirring or agitation of the sewage, sludge and diffused air by the movement of the conveyor with its paddle-like buckets.

In any one or all of the zones a, b, and c, additional porous diffusers 43 may be provided, if desired, and these may be located so as to provide successive tracts of aeration e and of flocculation f in any zone, if the oxygen supply is not sufficient to satisfy the demand of the sludge until it reaches the next successive zone. In the downward sweeping actions, the sludge utilizes the oxygen contained in the aerated liquors, and diffusers may be disposed as may be necessary in order to avoid any exhaustion of the oxygen supply.

In each of the treating zones a, b and c, the processes of aeration, bacterial action, absorption, and flocculation are continuously carried on. Moreover, there is effected a constant sweeping action or blanketing effect downwardly through the deeper strata of the sewage. The activated sludge particles are constantly brought into contact with the influent colloidal particles so that the bacteria can gather in the flocculi in immense numbers and also so that the suspended particles will grow by the accretion of the material diffused throughout the sewage. In each zone each tract of aeration is followed by a tract of flocculation, so that the system provides through the successive zones for a progressive process of rejuvenescence or building up of biological sludge for bringing about absorption, flocculation, and clarification. The oxygen demand is continuously satisfied through the absorption action due to continuous intermixing accompanied by the successive sweeping actions which remove suspended solids and colloidal matter so that the sewage becomes more and more clear and purified as it moves from zone to zone.

By referring to Fig. 1, it will be seen that for the removal of the sludge which is deposited in the sumps or hoppers 11, I may provide a sludge pump 44 operated by a motor 45, and a suitable sludge draw-off piping 46 extending from each of the sludge suction pipes 16 to the sludge pump. The sludge drawn off from the sumps or hoppers may be discharged by the pump through a piping 47 for such disposition as may be desired. For supplying air to the porous diffusers 43, I may provide an air compressor 48 operated by a motor 49, there being an air piping as 50 extending from the air compressor to the diffuser in each of the zones a, b and c. For driving the endless conveyors, I may provide a motor 51 which, through a reducer 52, operates a shaft 53 from which power is transmitted to the driving shafts 34 of the respective conveyors. In the present embodiment, I show chain driven transmissions 54 connected between the driving shaft 53 and the shafts 34 of the endless conveyors located in zones b and c. The driving shaft 34 for the conveyor within zone a is operated through a chain transmission 55 from the driving shaft 34 of the conveyor within zone b, while for the operation of the conveyor within zone d power is taken through a chain transmission 56 from the driving shaft for the conveyor within zone c.

It is in place to remark here that the sludge deposited in the hoppers may, if desired, be wholly or partially returned to the process. In practice, it may be especially desirable to return to the process, the sludge deposited in the first hopper, that is to say, the hopper located at the bottom-front of zone a, inasmuch as some sludge that has not been properly aerated will find its way into this hopper which is directly below the flow of incoming sewage.

In the present embodiment, the zone d comprises a final sedimentation and clarification chamber. The endless conveyor 21 within this chamber, instead of being provided with paddle-like buckets, is furnished only with scrapers 57 for removing sediment from the bottom of the chamber into the sump or hopper adjacent the beginning thereof. As illustrated in Fig. 7, I may provide in the bottom of each or any one of the sumps or hoppers 11 a perforated air pipe 58, the purpose of which is to keep the sludge stirred up for ready removal by the suction line. Furthermore, by keeping the sludge stirring up, it will be removed through the suction line before it has an opportunity to become septic. Air for the perforated air pipe 58 may be furnished from any suitable source, as from the air compresser 48. In this connection, I may make mention of the fact that instead of employing sumps or hoppers 11 for receiving the sludge scraped from the bottoms of the zones, I may make use of suitable conveyors (not shown) located so as to receive the excess sludge removed from the zone bottoms by the scrapers on the conveyors.

From the foregoing description taken in connection with the example illustrated in the drawings, it is thought that my improved aeration-flocculation process and apparatus for the complete treatment, purification and final clarification of sewage and waste will be readily understood. In each of the zones, except zone d which comprises the final sedimentation and clarification chamber, aeration is followed by flocculation, these actions taking place as the sewage moves through the successive zones in the same tank, there being returned to the beginning of each zone a portion of the sludge flocculated and settled in that particular zone. It will be appreciated that there is a continuous intermediate removal of sludge flocculated and settled in each zone, and that the sludge so removed constitutes sludge which is in excess of what is necessary for the return to the beginning of each zone. In each successive zone the floc settling therein treats the unpurified portion of impurities which were not removed in the preceding zone.

One of the important advantages of the present invention is that only sufficient air for satisfying the biological oxygen demand of the sewage and returned sludge mixture is provided. Where conditions warrant, the air entrapped and diffused by the paddle-like buckets may be sufficient, in which event the air will be shut off from the porous diffusers. It will be appreciated that, under normal conditions, only a small amount of air is required for meeting the biological oxygen demand of the sewage and returned sludge mixture. By those familiar with this art, it will be appreciated that the satisfaction of the biological oxygen demand will proceed with only a small amount of residual dissolved oxygen present as well as when near saturation is maintained. By the present apparatus and system, it will be recognized that I avoid moving the entire volume of sewage in the tank by air or mechanical means, and that there is maintained a movement which is merely sufficient for the introduction of oxygen and for properly mixing the sludges and liquors, the sludge being conveyed and circulated by means of the buckets and permitted to utilize the forces of gravity, meanwhile picking up oxygen from the liquors as the downward sweep is accomplished. The circulating buckets provide a continuous supply of activated sludge which is discharged from the buckets at a point of aeration where it is immediately mixed with aerated liquor, consisting of raw sewage or sludge sewage mixture not flocculated or settled in the preceding zone, but which is allowed to settle and sweep downward through the oxygenated liquid.

In my improved apparatus, the proportion of space in each zone for aeration is such as to partially or completely saturate the mixture of untreated or partially treated or purified sewage and returned sludge with dissolved oxygen and to mix the returned sludge; while the proportion of space for flocculation is such as to utilize the major portion of the dissolved oxygen. The intermittent introduction and utilization of dissolved oxygen provides for more efficient use of the oxygen introduced within the available tank space. The downward sweeping action of the heavier solids returned from the bottom of the tank in each zone and discharged at the top thereof aids materially in the flocculation process and in the separation and settling of the lighter solids and colloids contained in the sewage sludge mixture. This inevitably hastens and improves the clarification of the final effluent. These beneficial effects are an important part in the economies effected by the use of my apparatus and system.

Another point to be considered is that the constant removal of solids from each zone progressively reduces the load on the process, requiring less total air to satisfy the biological oxygen demand of the sludge. The lower the concentration of sludge carried in the system, the lower the oxygen required to satisfy the biological oxygen demand.

It will be appreciated that the buckets keep the sludge in circulation and in contact with raw sewage and liquor containing dissolved oxygen. With the use of the buckets, circulating with the conveyor to pass successively through the sludge tract, the aeration tract and flocculation tract, there is no exhaustion at any time of oxygen in the sludge liquor. This is important since in cases where the oxygen becomes exhausted, the immediate demand for oxygen must not only be satisfied but the sludge itself must be revivified by aeration before the physical and biological forces become effective in treating incoming sewage. In the present invention, by the division of the tank into zones and distinctive tracts and by the use of the buckets, the oxygen demand of the sewage, sludge and liquor is constantly met. The sludge is not allowed to stand so that the work done in building it up is never lost.

Attention is also directed to the fact that in making use of the buckets, there is no need for sludge return pumps. The buckets also make possible the elimination of grit chambers, separate primary sedimentation tanks, and makes possible the complete treatment in a continuous properly baffled tank.

Other modes of applying the principles of my invention may be employed, instead of the one which has been given herein for clearness of understanding only. The continuous tank may be of any known or approved type or variety forming part of a sewage treatment or conditioning system or plant, and the treatments carried through in the successive zones may be practiced independently of or in conjunction with any known or approved method of conditioning raw sewage.

It will be recognized that many apparently widely different embodiments of my invention could be made without departing from the principles of the invention or from the scope thereof, and it is intended that all matter contained in the above description or illustrated in the accompanying drawings shall be interpreted as illustrative and not in a limiting sense. The terms and expressions which I have employed are used as terms of description and not of limitation, and I have no intention, in the use of such terms and expressions, of excluding any equivalents of the methods shown and described or portions thereof, but recognize that various modifications are possible within the scope of the invention claimed.

I claim:—

1. A sewage treating apparatus comprising a treating chamber having hydraulic flow, means for aerating a portion of the sewage to produce an aerated tract in the chamber, an endless conveyor for carrying sludge settlings from the bottom of the chamber into contact with the sewage of the aerated tract to produce an aerated sewage and sludge mixture, one portion of said conveyor extending outside said aeration tract and adapted in conjunction with the hydraulic flow to cause movement of the mixture into a different tract of sewage in the chamber for flocculation.

2. A sewage treating apparatus comprising a treating chamber having an inlet for the influx of sewage at one end and on outlet at the opposite end to produce a hydraulic flow, means for passing air into the influx of sewage to provide an aeration tract in the sewage, conveying means between the ends operating to carry sludge settlings from the bottom of the chamber through the aeration tract to produce in the hydraulic flow a mixture of aerated sewage and sludge which is carried by the flow to adjacent the outlet end for flocculation.

3. A sewage treating apparatus comprising a treating chamber having an inlet for an influx stream of sewage and a bottom region for the accumulation of sludge below the influx stream, means for passing air into the influx stream to provide an aeration tract, a conveyor for carrying sludge settlings through said bottom region and upwardly therefrom through the aeration tract to produce a mixture of aerated sewage and sludge, one portion of the conveyor extending outside of said aeration tract and adapted to cause movement of the mixture into a different tract of sewage in the chamber for flocculation.

4. A sewage treating apparatus comprising a treating chamber having a bottom sump, an inlet for the influx of sewage into the chamber above the sump, means for aerating the influx of sewage, a conveyor disposed to carry activated sludge through the aerated sewage influx to produce thereby an aerated mixture of sewage and sludge, said conveyor having an operating portion effective to cause movement of the mixture to a different tract of the sewage in the chamber for flocculation.

5. In a sewage treating system including a treating chamber, the combination of means for passing air into the sewage of the chamber to provide an aeration tract therein, a conveyor circulating from and to a sludge settling tract of the sewage and passing through said aeration tract, and buckets on the conveyor for carrying sludge from the sludge settling tract for distribution in direct contact with the air and sewage of the aeration tract to produce a mixture of aerated sewage and sludge.

6. In a sewage treating system, the combination with a treating chamber having within the sewage therein an aerating tract below the liquid surface followed by a flocculation tract and both having location above an activated sludge tract, of a conveyor circulating through the sewage of the chamber and through the two first-named tracts for carrying sludge from the sludge tract to the aerating tract for producing a mixture of aerated sewage and sludge, said conveyor operating with respect to the flocculation tract to cause movement of the mixture to the flocculation tract.

7. In a sewage treating system, the combination with a treating chamber having an inlet for an inflowing stream of sewage and a bottom with a sump below said stream, of a conveyor circulating through the sewage adjacent the bottom and sump and through the inflowing stream, means for aerating the inflowing stream, means on the conveyor for gathering sludge at the bottom and carrying the same to the aerated stream for producing a mixture of aerated sewage and sludge, and scrapers on the conveyor for removing sludge from the bottom into the sump.

8. In a sewage treating system, the combination with a treating chamber having an inlet for an inflowing stream of sewage and a bottom with a sump below the stream, of a conveyor circulating through the sewage adjacent the bottom and sump and through the inflowing stream, means for aerating the inflowing stream below the surface of the sewage, means on the conveyor for gathering sludge at the bottom and carrying the sludge to the aerated stream for producing a mixture of aerated sewage and sludge, scrapers on the conveyor for removing sludge from the bottom into the sump, and said conveyor being effective on its circulation from the stream to cause movement of the mixture into a tract of the sewage above the bottom for flocculation.

9. In a sewage treating system, the combination with a treating chamber having an aerating tract below the sewage surface and a sludge tract at its bottom, of a conveyor circulating through the sludge tract and aerating tract, also to and from a point above the sewage surface, buckets on the conveyor for gathering sludge in the sludge tract and carrying the same to the aerating tract, said buckets on the circulation of the conveyor passing above the sewage surface to entrap air for distribution in the aerating tract to produce a mixture of activated sludge and sewage.

10. In a sewage treating apparatus including a treating chamber for the flow of sewage, the combination of a conveyor circulating from the effluent end of the chamber to the influent end thereof and thence back to the effluent end, paddle-like buckets carried by the conveyor and adapted to carry sludge from the deeper strata of sewage for release in the influent stream, said conveyor being arranged to move the buckets through the atmosphere above the sewage surface to entrap air prior to releasing their contents in the sewage.

11. In a sewage treating apparatus, a treating chamber for the flow of sewage, having an influent end and an effluent end, a conveyor circulating from the effluent end to the influent end and thence back to the effluent end, a zone below the influent stream for the accumulation of sludge, paddle-like buckets carried by the conveyor and adapted to carry sludge from the deeper strata of sewage for release in the influent stream, said conveyor being arranged to move the buckets through the atmosphere above the sewage surface to dump their sludge through the air into the sewage and to entrap air to be carried into the sewage, and members carried by the conveyor for removing sludge to said zone of sludge accumulation.

12. In a sewage treatment system, the combination in a tank of a plurality of zones for aeration and flocculation of sewage, means for maintaining a sewage flow through the zones of the tank, passing successively from zone to zone, means for passing air into the sewage of each zone to provide aerating tracts, means for removing activated sludge settlings in each zone to the beginning of the aerating tracts to produce an aerated sewage and sludge conglomerate, and means for diffusing the conglomerate for flocculation prior to the passing of the sludge into the next succeeding zone.

13. A method of treating sewage which comprises passing a stream of sewage through a plurality of treating zones of substantial depth, continuously diffusing air into the upper section of each zone to form therein an aeration tract, collecting activated sludge from the lower section of each zone and elevating and discharging it into said aeration tract in such a manner that it will diffuse through said tract and form therein a sludge blanket, and continuously settling said sludge blanket through a flocculation tract and simultaneously advancing a portion thereof into the next succeeding zone.

14. In a multi-zone sewage treatment apparatus in which sewage moves progressively from zone to zone, a circulating conveyor for continuously removing sludge from the deeper strata and into the influent stream of each zone and passing into the atmosphere to entrap air for release in contact with the sewage and sludge to produce in each zone an aerated sewage and sludge mixture, said conveyor being effective to diffuse the mixture for flocculation adjacent the effluent end of each zone.

15. In a multi-zone sewage treatment apparatus in which sewage moves progressively from zone to zone and from an influent end to an effluent end of each zone, means for passing air into the sewage of each zone to provide an aerating tract, a bottom sump adjacent the beginning of each zone, a circulating conveyor continuously removing sludge from the deeper strata of sewage to the aerating tract of each zone to produce an aerated sewage and sludge mixture, said conveyor during its circulation being effective to diffuse the mixture for flocculation adjacent the effluent end of each zone, and means on the conveyor for removing sludge from the bottom of each zone into the bottom sump at the beginning thereof.

SAMUEL I. ZACK.